Feb. 26, 1946. M. R. ARNOLD 2,395,529
PREFERENTIAL ABSORPTION OF HYDROCARBONS
Filed March 14, 1945
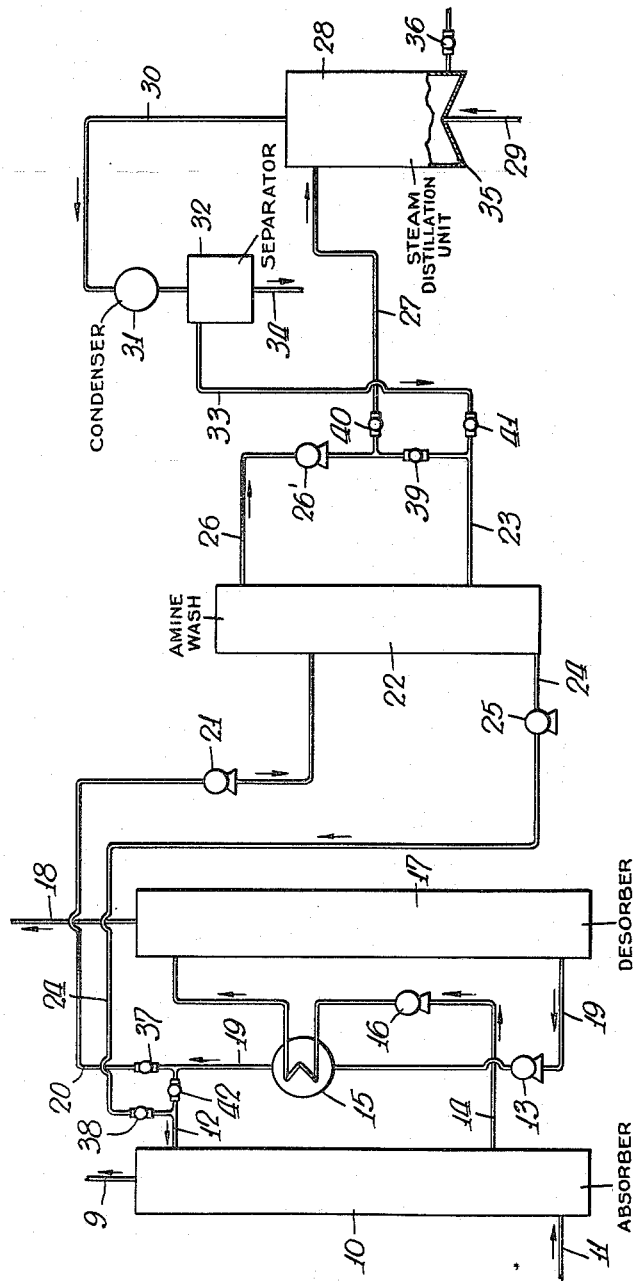
INVENTOR
Melvin R. Arnold
BY
Dean Fairbanks Horack
ATTORNEYS
45-21

Patented Feb. 26, 1946

2,395,529

UNITED STATES PATENT OFFICE 2,395,529

PREFERENTIAL ABSORPTION OF HYDROCARBONS

Melvin R. Arnold, Louisville, Ky., assignor to The Girdler Corporation, Louisville, Ky., a corporation of Delaware Application March 14, 1945, Serial No. 582,738

16 Claims. (Cl. 260—681.5)

The present invention relates to absorption of hydrocarbons and more particularly to the preferential absorption of unsaturated hydrocarbons from hydrocarbon mixtures containing the same.

In certain processes for the absorption and removal of unsaturated hydrocarbons, such as butadiene, ethylene, propylene and butylene, from mixtures of hydrocarbons containing the unsaturated hydrocarbon, which it is desired to remove, together with either other unsaturated hydrocarbons or saturated hydrocarbons or both, and in which processes copper-ammonium solutions have been employed as the absorption medium, operating difficulties frequently have been encountered due to the presence of small quantities of undesirable constituents which are absorbed into the absorption medium from the hydrocarbon mixture along with the unsaturated hydrocarbon which it is desired to remove from such mixture. The exact chemical composition of these constituents is not definitely known, but it is believed that they include at least some acetylenic compounds.

As is well known, in the practice of processes such as referred to above, contact between the absorption solution and the hydrocarbon mixture is effected in an absorption stage wherein the unsaturated hydrocarbon which it is desired to remove from the mixture is absorbed by the absorption solution, and then the absorption solution is passed to a desorption stage where the absorbed hydrocarbon is separated from the solution, after which the solution is returned to the absorption stage for further use. The undesirable constituents above mentioned are not given off to any great extent with the desorbed hydrocarbon in the desorber stage, and they tend to accumulate in the absorption solution. If such constituents accumulate to any substantial degree in the absorption solution, they cause foaming of the solution in either the absorption stage or the desorption stage, or both, in those cases where the hydrocarbon mixture is in gaseous form in the absorption stage. Also, in those cases where the hydrocarbon mixture is in liquid form in the absorption stage, the undesirable constituents if present in any substantial quantity produce emulsification in the absorption stage as well as foaming or emulsification, or both, in the desorber stage. An additional disadvantage of such undesirable constituents in the absorption solution is that if they are permitted to increase to any substantial degree, they may reduce the capacity of the solution to absorb the hydrocarbon which it is desired to remove from the hydrocarbon mixture, so that some of said hydrocarbon may be lost. Such undesirable constituents are also probably the cause of sludges forming in various parts of the plant equipment. A further disadvantage is that small quantities of such constituents may be given off with and contaminate the hydrocarbon which is released from the absorption solution in the desorber stage. This latter is particularly disadvantageous in those cases where butadiene is the unsaturated hydrocarbon which it is desired to remove from the hydrocarbon mixture, since butadiene is used to a large extent in polymerization reactions for the production of synthetic rubber, and in other chemical processes, where it is important that it be as free as possible of contaminating impurities.

I have now discovered a method whereby such foam- and emulsion-forming constituents may be removed from copper-ammonium solutions used for the preferential absorption of unsaturated hydrocarbons from hydrocarbon mixtures containing the same, so that such solutions may be kept continuously up to full strength, purity and efficiency, and so that foaming, emulsification and production of sludges may be inhibited or entirely prevented.

In carrying out my invention, I subject the absorption solution, after liberation of the absorbed unsaturated hydrocarbon therefrom in the desorber stage, to the action of a liquid amine, or mixture of liquid amines, having the required characteristics hereinafter set forth. Such amine or amines may be circulated in a closed cycle, including the step of extracting or absorbing the foam- and emulsion-forming constituents from the absorption solution, and a purifying step wherein such constituents are deposited or removed from the liquid amine. Thus two absorbing liquids are circulated, one such liquid, the copper-ammonium solution, taking up the unsaturated hydrocarbon from the hydrocarbon mixture at one stage and giving up such unsaturated hydrocarbon substantially pure at another stage, and the second liquid, the amine, taking up the foam- and emulsion-forming constituents from the absorption solution at one stage and giving up such constituents at another stage.

As previously indicated, the undesired constituents when accumulated to any substantial extent in the copper-ammonium absorption solution, may produce foaming in some cases and emulsification in other cases, and both foaming and emulsification in still other cases. As the said undesired constituents may have been chemically altered by or in each of the two liquids referred to above, and as such constituents are removed from the liquid amine preferably by heat or by steam distillation which probably further alters them, it is practically impossible to determine from an examination of the constituents in their final form what was their original chemical composition in the initial hydrocarbon mixture. These constituents may include a plurality of different compounds, only certain of which may cause the foaming or emulsification. In any case, however, I have found that removal of those undesired constituents, whatever they may be, by the process herein described, inhibits or entirely eliminates undesirable foaming and emulsification. For want of more definite information as to the chemical composition and physical properties of those undesired constituents, I will hereinafter refer to all of such constituents which are absorbed in the absorption solution and which are removed therefrom by the amine liquid, as "foam-forming compounds," even though only one or certain ones of such compounds, if not removed, cause the foaming and/or emulsification.

I do not claim as my invention or discovery the extraction or absorption of unsaturated hydrocarbons from hydrocarbon mixtures containing the same by the use of copper-ammonium solutions, or the release of absorbed unsaturated hydrocarbons from such solutions, but such steps do constitute part of my complete process whereby foaming and emulsification during such extraction or absorption, and also during desorption, are inhibited or prevented.

As previously indicated, I employ an amine or mixture of amines for the treatment and purification of the absorption solution in the practice of the process herein described. Amines which are suitable for the carrying out of my invention are those having the following characteristics:

1. They must be liquid at operating temperatures;
2. They must be substantially insoluble in the copper-ammonium solution employed in the absorption of the unsaturated hydrocarbon from the hydrocarbon mixture; and
3. They must contain at least one nitrogen atom linked on one side to at least one hydrogen atom. The other nitrogen linkages may be aliphatic, cycloaliphatic, heterocyclic or aromatic radicals.

While all primary or secondary amines, or both, may be used in the practice of my invention, tertiary amines are not suitable. I prefer to use primary aromatic amines. Specific examples of amines which are suitable for the carrying out of my invention, are aniline, o-anisidine, o-toluidine and ethyl aniline.

Although, as previously indicated, my invention is applicable and advantageous in the preferential absorption of various unsaturated hydrocarbons from hydrocarbon mixtures containing the same, I will for simplicity describe my invention more in particular as applied in the preferential absorption and recovery of butadiene.

In the practice of my invention for the elimination of foaming and/or emulsification tendencies in copper-ammonium solutions used for preferential absorption of butadiene from hydrocarbon mixtures containing the same, the copper-ammonium solution, after having been contacted with the hydrocarbon mixture, is further contacted in any suitable manner in a liquid-liquid phase extraction process with any suitable amine or mixture of amines having the required characteristics hereinbefore specified, the preferred amine being aniline. Such extraction may be carried out at atmospheric pressure, superatmospheric pressure, or subatmospheric pressure, and by either batch or continuous process, as may be desired. Also, the process may be carried out at any suitable temperature, but I prefer that the temperature should not exceed 50° C., and 25° C. to 50° C. is the preferred temperature range which should be maintained in the practice of my invention.

The accompanying drawing illustrates diagrammatically one way in which the process of my invention may be incorporated in a cyclic process for the selective recovery of butadiene from a gaseous hydrocarbon mixture containing the same, with the butadiene absorption medium being treated at an intermediate stage in accordance with the process of my invention.

In the drawing, column 10 represents a conventional absorption tower containing packing of any common type permitting the downflow of the absorption solution and the upflow of gas or vapor in intimate counterflow contact with the absorption solution. The gaseous hydrocarbon mixture, containing butadiene, is delivered to the bottom of this column through the line 11, and the gas, substantially free of butadiene, leaves the top through line 9. The absorption solution, which may be copper-ammonium-acetate or other suitable copper-ammonium solution, is fed to the top of the column 10 through the line 12, preferably by means of a circulation pump 13. The absorption solution, rich in butadiene after contact with the hydrocarbon mixture, is withdrawn from the bottom of column 10 through line 14 and heat exchanger 15 by suitable means such as pump 16, and is fed into the upper part of desorber column 17 where butadiene gas is released from the solution by reduction in pressure, in a well known manner, and passes out of the top of column 17 through pipe 18. The operation of columns 10 and 17, however, does not per se form any novel part of my invention, as these columns are used in the known butadiene recovery apparatus.

The absorption solution containing objectionable foam-forming compounds is drawn from the bottom of tower 17 through line 19 by the pump 19. All or a portion of the contaminated solution is drawn from line 19 through a branch line 20 by a pump 21, and is introduced into amine wash tower 22 near the top. Tower 22 may be an absorption tower containing any suitable means for effecting intimate contact between the materials flowing countercurrently therein. A liquid amine, or mixture of such amines, having the required characteristics hereinbefore specified, as for example aniline, is introduced into tower 22 through line 23 and, in countercurrent flow in contact with the copper-ammonium solution, absorbs the foam-forming compounds from said solution. The purified absorption solution, free of foam-forming compounds, is withdrawn from the bottom of the amine wash tower 22 through line 24 by pump 25, and is returned to the top of column 10 through line 12 together with, or separate from, other streams, such as that from line 19.

The amine containing the extracted foam-forming compounds is drawn from the top of tower 22 through line 26 by pump 26', and all or a portion of this contaminated amine is withdrawn from line 26 through branch line 27 to unit 28 which is supplied with steam through line 29. There the impure amine is purified by steam distillation in a well known manner. I have found that substantially complete recovery of aniline may be obtained when such steam distillation is conducted under proper conditions. The purified amine from unit 28 then passes through line 30 and condenser 31 to separator 32, where it is separated from the aqueous condensed steam layer. The recovered purified amine flows from the separator through line 33 to line 23 and returns to the wash tower 22. The condensed water is removed from the separator 32 through line 34.

The steam blown into the amine in the distillation unit 28 vaporizes the aniline but does not vaporize the foam-forming compounds which are in some altered form due to the action of the copper-ammonium solution or the action of the steam. Regardless of how or where such alteration occurred, said compounds are found to be substantially non-volatile when in the steam distillation unit, and they do not pass out of said unit with the steam and volatilized amine. The bottom of this unit may have a trough 35 in which these compounds collect, and if they are sufficiently fluid they may be drawn off from time to time through a drain cock 36. If they are non-flowable the circulation of the amine may be stopped for a while by closing valves 37 and 38 and stopping pumps 21 and 25, without stopping the circulation of the butadiene absorption solution. The unit 28 may be then opened up and cleaned out. If desired there may be two of the units 28 connected in parallel, so that one may be used while the other is being cleaned out. It will be understood that the amount of material collecting in the unit 28 will be relatively small, as a very small quantity of foam-forming compounds in the copper-ammonium solution will cause highly objectionable foaming. The valve 39 may be closed and the valves 40 and 41 open in the normal operation above described, but for cleaning the unit 28 I may keep the amine circulating by closing the valves 40 and 41 and opening the valve 39, thus letting the foam-forming compounds accumulate in the amine for a while during cleaning out of the unit 28. The steam distillation and purification of the amine may be conducted only at intervals, or may be operated continuously, depending upon the rate at which the amine becomes contaminated. Likewise, the entire purification system for the copper-ammonium solution may be operated only intermittently if the amount of foam-forming compounds initially in the hydrocarbon feed mixture and absorbed therefrom by the copper-ammonium solution, is very small. By partially opening the valves 37, 38 and 42, the stream of copper-ammonium solution may be split and a part returned from line 19 to the absorber 10 and a part sent through line 20 to the amine wash, and returned through line 24.

I have described the purification of the amine by steam distillation, but I may employ hydrolysis, in dilute acid or alkaline solution, and steam distillation in an alkaline medium. Any organic acids in the foam-forming compounds could be recovered by steam distillation and/or fractional crystallization of their metal organic salts.

The following table shows the results obtained in foam tests made on a copper-ammonium solution before it had been used and after it had been used for the absorption of butadiene from a gaseous hydrocarbon stream which contained foam-forming compounds. The effect of extracting this used copper-ammonium solution with amines according to the process of my invention also is shown. Values are given for the volume of foam formed and the break time of the foam after gas has been passed at a constant rate through the solution, in order to induce foaming, for periods of 20 seconds and 5 minutes. By the "break time" I mean the time required for foam to completely subside after the passage of gas through the solution had been discontinued.

| Solution | Extraction medium | Foam vol. 20 seconds | Break time 20 seconds | Foam vol. 5 minutes | Break time 5 minutes |
|---|---|---|---|---|---|
| Fresh copper-ammonium solution. | None | 37 cc | 6.3 seconds | 95 cc | 9.2 seconds. |
| Used copper-ammonium solution. | do | 290 cc | 500 seconds [1] | Foamed over immediately.[2] | 500 seconds.[1] |
| Do | Aniline | Negligible | Negligible | Negligible | Negligible. |
| Do | o-Anisidine | 30 cc | 10.1 seconds | 40 cc | 12.6 seconds. |
| Do | o-Toluidine | 50 cc | 12.5 seconds | 58 cc | 22.3 seconds. |
| Do | Ethyl aniline | 153 cc | 93.3 seconds | Foamed over 98 seconds[2] | 198.1 seconds. |

[1] No break in foam after 500 seconds.
[2] Foam volume greater than 400 cc.

The used copper-ammonium solution employed in the above tests was obtained from a butadiene absorption plant. It is thus apparent from the above table that the foaming characteristics were introduced into the solution during the butadiene absorption operation. The above tabulated tests clearly show some of the beneficial results that are obtained by the extraction of such used solutions with amines in accordance with my invention. As indicated by the above table, best results are obtained when the amine is a primary amine, specifically, aniline. Also, primary amines such as o-anisidine and o-toluidine, though somewhat less effective than aniline, still are sufficiently effective to render their use highly advantageous for removal of foam-forming compounds in commercial operation. The above tabulated tests indicate, however, that the secondary amines, such as ethyl aniline, though effective to a substantial degree in reducing foaming tendencies, are not as effective as the primary amines. Thus, although secondary amines will lessen the amount of foaming and considerably reduce the stability of the foam, the primary aromatic amines are preferred for carrying out the process of my invention.

Having thus described my invention what I claim as new and desire to secure by Letters Patent is:

1. The process of purifying a copper-ammonium solution which has been used for absorption of an unsaturated hydrocarbon from a hydrocarbon mixture, to substantially prevent foaming and emulsification during reuse of said solution, which process includes treating said solution with a liquid amine selected from the group consisting of primary and secondary amines which are substantially insoluble in said solution.

2. The process of recovering an unsaturated hydrocarbon from a hydrocarbon mixture, which includes circulating a copper-ammonium solution in a closed cycle, including an absorber through which the hydrocarbon mixture is passed and in which unsaturated hydrocarbon is absorbed from said mixture into said solution, a desorber in which the unsaturated hydrocarbon is released from said solution, and a washing unit where absorbed foam-forming compounds are removed from said solution by the action of a liquid amine selected from the group consisting of primary and secondary amines which are substantially insoluble in said solution.

3. In a process for selectively recovering an unsaturated hydrocarbon from a hydrocarbon mixture by the action of a copper-ammonium solution which is circulated in a closed cycle through an absorber for absorption of the unsaturated hydrocarbon into said solution, and through a desorber where said absorbed unsaturated hydrocarbon is released from said solution, the improvement which consists in preventing foaming of said solution and the forming of emulsions therein, by washing said solution, after contact of the solution with said hydrocarbon mixture, with a liquid amine selected from the group consisting of primary and secondary amines which are substantially insoluble in said solution.

4. In a process in which an unsaturated hydrocarbon is removed from a hydrocarbon mixture by absorption into a copper-ammonium solution and then is separated from said solution and the solution is returned for contact with further hydrocarbon mixture, the improvement which consists in preventing foaming of said solution by subjecting said solution to the action of a liquid amine to absorb foam-forming compounds therefrom after separation of said solution from said mixture and prior to return of said solution for contact with further quantities of said mixture, and removing said foam-forming compounds from at least a portion of said amine before returning said portion of the amine for contact with further quantities of said copper-ammonium solution, said amine being selected from the group consisting of primary and secondary amines which are substantially insoluble in said solution.

5. In a process for the recovery of an unsaturated hydrocarbon from a mixture of hydrocarbons, the steps which include absorbing said unsaturated hydrocarbon from said mixture by the action of a copper-ammonium solution, substantially removing said unsaturated hydrocarbon from said solution, contacting said solution with a liquid amine to extract foam-forming compounds from said solution, steam-stripping said liquid amine from said compounds, and returning said liquid amine for further contact with said copper-ammonium solution, said amine being selected from the group consisting of primary and secondary amines which are substantially insoluble in said solution.

6. The process of removing from a copper-ammonium solution foam-forming compounds which have been absorbed into said solution from a mixture of hydrocarbons, which process includes circulating in a closed cycle a liquid amine selected from the group consisting of primary and secondary amines which are substantially insoluble in said copper-ammonium solution, in which cycle said liquid amine contacts with said copper-ammonium solution in one part of the cycle to remove foam-forming compounds from said solution, and is purified in another part of the cycle to separate said compounds from said amine.

7. The process which includes removing foam-forming compounds from a copper-ammonium solution by absorbing said compounds in a liquid amine selected from the group consisting of primary and secondary amines which are substantially insoluble in said solution, steam-stripping said amine from said compounds, condensing the amine and returning it for further absorption of said compounds from said solution.

8. The process which includes removing foam-forming compounds from a copper-ammonium solution by absorbing said compounds in aniline, steam-stripping said aniline from said compounds, condensing the aniline, and returning it for further absorption of said compounds from said solution.

9. The process which includes circulating aniline in a closed cycle in one part of which it contacts with a copper-ammonium solution to remove foam-forming compounds from said copper-ammonium solution, and in another part of which it is distilled to remove said foam-forming compounds from said aniline.

10. The process of preventing foaming and/or emulsification during absorption of an unsaturated hydrocarbon from a mixture of hydrocarbons by the action of a copper-ammonium solution, which process includes withdrawing said solution containing absorbed unsaturated hydrocarbon and foam-forming compounds from contact with said mixture, substantially removing the unsaturated hydrocarbon from said solution, washing said solution with a liquid amine to remove therefrom foam-forming compounds, which amine is selected from the group consisting of primary and secondary amines which are substantially insoluble in said solution, and returning said solution for contact with further hydrocarbon mixture.

11. The process of preventing foaming in an absorber for removing an unsaturated hydrocarbon from a hydrocarbon mixture, which includes circulating a copper-ammonium solution in a closed cycle, including said absorber where said unsaturated hydrocarbon is absorbed from said hydrocarbon mixture, a desorber wherein said absorbed unsaturated hydrocarbon is substantially removed from said copper-ammonium solution, and a washer where foam-forming compounds absorbed from said hydrocarbon mixture are substantially removed from said copper-ammonium solution, and from which washer said copper-ammonium solution is returned to said absorber, and circulating liquid amine in a closed cycle through said washer where said compounds are absorbed by said amine, and a purifier where said compounds are removed from said amine and from which purifier the purified liquid amine is returned to said washer, said amine being selected from the group consisting of primary and secondary amines which are substantially insoluble in said solution.

12. The process of recovering butadiene from a hydrocarbon mixture, which includes absorbing butadiene from said mixture by the action of a copper-ammonium solution, liberating the butadiene from said solution, and separating foam-forming compounds from said solution by the action of a liquid amine selected from the group consisting of primary and secondary amines which are substantially insoluble in said solution.

13. The process of recovering butadiene from a hydrocarbon mixture, which includes absorbing butadiene from said mixture by the action of a copper-ammonium solution, separating the butadiene from said solution, separating foam-forming compounds from said solution by the action of a liquid amine selected from the group consisting of primary and secondary amines which are substantially insoluble in said solution, returning the copper-ammonium solution for contact with further quantities of said hydrocarbon mixture, removing said foam-forming compounds from said liquid amine, and returning said amine for further action on said copper-ammonium solution.

14. In a process of recovering butadiene from a mixture of hydrocarbons, which process includes bringing a copper-ammonium solution and said mixture into contact with each other to effect absorption of the butadiene into said solution, then separating said solution from said mixture, releasing the butadiene from the solution and returning the solution for further contact with said mixture of hydrocarbons, the improvement which consists in preventing foaming and emulsification of said solution during such reuse thereof by removing from said solution foam-forming compounds which have been absorbed from said hydrocarbon mixture, said removal being effected by contacting said solution with a liquid amine after the butadiene has been removed from said solution and before said solution is returned for further contact with the hydrocarbon mixture, said liquid amine being selected from the group consisting of primary and secondary amines which are substantially insoluble in said solution.

15. The process of recovering butadiene from a hydrocarbon mixture, which includes absorbing butadiene from said mixture by the action of a copper-ammonium solution, separating the butadiene from said solution, and separating foam-forming compounds from said solution by the action of aniline.

16. The process of recovering butadiene from a hydrocarbon mixture, which includes absorbing butadiene from said mixture by the action of a copper-ammonium solution, separating the butadiene from said solution, separating foam-forming compounds from said solution by the action of aniline, returning the copper-ammonium solution for contact with further quantities of said mixture, removing said foam-forming compounds from said aniline, and returning said aniline for further action on said copper-ammonium solution.

MELVIN R. ARNOLD.